(12) United States Patent
Berger et al.

(10) Patent No.: US 6,284,302 B1
(45) Date of Patent: Sep. 4, 2001

(54) METHOD AND DEVICE FOR COOLING AND ATOMIZING LIQUID OR PASTE-LIKE SUBSTANCES

(75) Inventors: Thomas Berger, Essen; Guido Büschkens, Krefeld; Klaus Lingler, Mönchengladbach; Peter Nobis, Neuss, all of (DE)

(73) Assignee: Messer Griesheim GmbH (DE)

(*) Notice: Subject to any disclaimer, the term of this patent is extended or adjusted under 35 U.S.C. 154(b) by 0 days.

(21) Appl. No.: 09/529,814

(22) PCT Filed: Sep. 29, 1998

(86) PCT No.: PCT/EP98/06177
§ 371 Date: Apr. 19, 2000
§ 102(e) Date: Apr. 19, 2000

(87) PCT Pub. No.: WO99/22855
PCT Pub. Date: May 14, 1999

(30) Foreign Application Priority Data

Oct. 31, 1997 (DE) .............................. 197 48 069

(51) Int. Cl.[7] .............................. A23L 3/00; F25D 31/00
(52) U.S. Cl. .............................. 426/524; 62/52.1; 62/64; 99/517; 426/519
(58) Field of Search .............................. 426/524, 519; 99/323.1, 517; 62/46.1, 52.1, 64, 373

(56) References Cited

U.S. PATENT DOCUMENTS

| | | | |
|---|---|---|---|
| 4,335,584 | * | 6/1982 | Lermuzeaux .................. 426/524 |
| 5,204,029 | * | 4/1993 | Morgan et al. ................. 426/524 |

FOREIGN PATENT DOCUMENTS

59196701 * 8/1984 (JP).

* cited by examiner

*Primary Examiner*—George C. Yeung
(74) *Attorney, Agent, or Firm*—Connolly Bove Lodge & Hutz LLP

(57) ABSTRACT

In a process for cooling and atomizing liquid or pasty substances or mixtures of substances, a liquid or pasty substance/mixture of substances is combined with liquid or supercritical carbon dioxide and then the mixture of liquid or pasty substance/mixture of substances and liquid or supercritical carbon dioxide is expanded. An apparatus for cooling liquid or pasty substances or mixtures of substances has a storage vessel for the liquid or pasty substance/mixture of substances, to which is allocated a line in which a device for transporting the liquid or pasty substance/mixture of substances is disposed. The apparatus has a source of liquid or supercritical carbon dioxide, to which source is allocated a line, and it has a connection point via which the line allocated to the storage vessel for the liquid or pasty substance/mixture of substances is connected to the line allocated to the source of liquid or supercritical carbon dioxide, and which has an expansion apparatus.

19 Claims, 4 Drawing Sheets

METHOD AND DEVICE FOR COOLING AND ATOMIZING LIQUID OR PASTE-LIKE SUBSTANCES

BACKGROUND OF INVENTION

Figure 1:
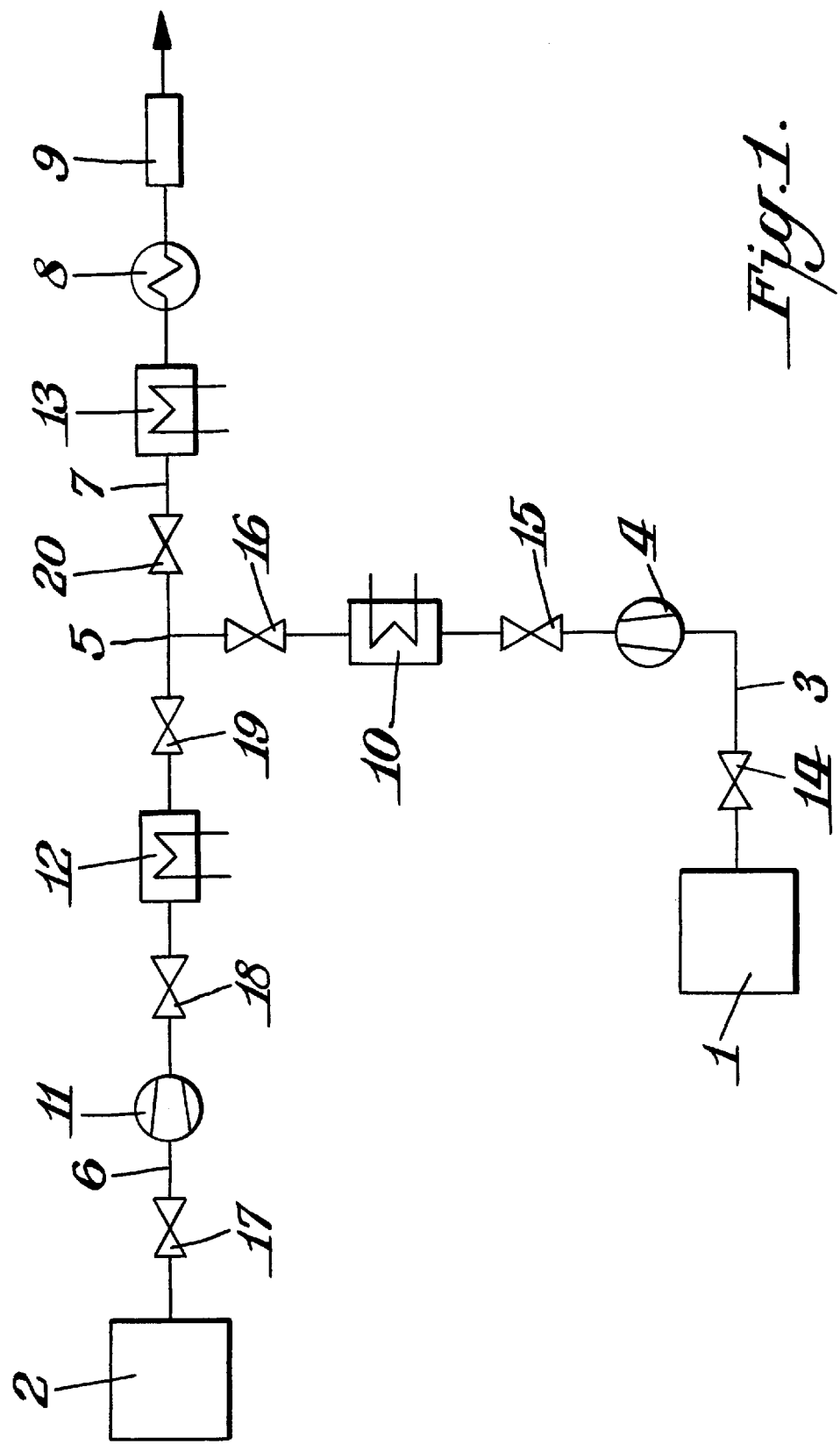

The invention relates to a process and an apparatus for cooling and atomizing liquid or pasty substances.

Cooling processes are used to change the product properties of substances. The substances to be cooled are generally treated in apparatuses whose cooling action is based on heat-transfer processes between a coolant and the substance to be cooled at cooling surfaces. The heat or cold transport between coolant and the substance to be cooled is therefore only indirect. A relatively rapid cooling of the substances, which is frequently required, cannot be achieved by this means. These cooling processes are also frequently unsuitable for carrying out a crystallization or a freezing, since insulating deposits form on the cooling surfaces which can impair the cooling process. Cooling processes of this type are, for example, described in Römpp Chemielexikon [Chemistry lexicon] and Pahlmann, Taschenbuch der Kältetechnik [Refrigeration manual].

It is further known that on an industrial level, spraying towers are used to produce pulverulent products with the use of conventional refrigeration.

Cryogenic cooling and freezing processes in which low-temperature gases are used are also prior art. Römpp Chemielexikon and Pahlmann, Taschenbuch der Kältetechnik, for example, disclose processes in which the substances to be cooled are sprayed with the refrigerant, in particular with liquid nitrogen or with solid carbon dioxide in the form of dry ice or snow. The direct contact of the refrigerant with the substances leads to a substantially more rapid cooling of the substances than with the abovementioned conventional processes. For a relatively rapid cooling of liquid or pasty substances this process also is unsuitable, since the cooling in the interior of the substances is determined by the heat transport through the substance itself, and the contact surfaces for a rapid cooling, for example for crystallization, are still too small. It is virtually impossible with these processes to produce readily meterable flowable substances.

The Cryopel® process, described in U.S. Pat. No. 4,967,571, the Cryobreak® process, described in DE 44 19 010 C1 and the Cryofals® process, described in DE 43 29 110 C1, are known processes in which liquid substances are cooled very rapidly by being introduced dropwise into liquid nitrogen. This cooling process can lead to a meterable pelleted substance. The particle sizes which are established are generally in the range of a few millimeters. The cooling is always performed to the temperature of the liquid nitrogen of approximately 77 K, which is not necessary or even undesirable in a multiplicity of applications.

In addition, an apparatus is known in which a liquid substance is brought into contact with liquid nitrogen, with the use of two-jet nozzles, in order to cool the substance rapidly. There is the disadvantage here that the product can be cooled as early as in the nozzle by the low-temperature nitrogen and can block this nozzle.

BRIEF SUMMARY OF THE INVENTION

The object of the invention is to provide a process and an apparatus by which the disadvantages of the prior art are overcome and by which a relatively rapid cooling and atomization of liquid or pasty substances is possible, in particular even relatively small amounts of the liquid or pasty substances being able to be cooled and atomized economically.

The object is achieved by a process in which liquid or pasty substances or mixtures of substances are cooled and atomized in which the liquid or pasty substance/mixture of substances is combined with liquid or super-critical carbon dioxide and then the mixture of liquid or pasty substance/mixture of substances and liquid or supercritical carbon dioxide is expanded. The process is carried out in such a manner that the mixture of liquid or pasty substance/mixture of substances and liquid or supercritical carbon dioxide is not expanded until on exit from the expansion apparatus. By means of this process, a very direct contact of the liquid or pasty substance/mixture of substances with the liquid or supercritical carbon dioxide is achieved. The carbon dioxide snow produced by the expansion (Joule-Thompson effect) or the gaseous carbon dioxide has a temperature of approximately 195 K, as a result of which the liquid or pasty substance/mixture of substances is cooled rapidly and instantaneously.

In the expansion, relatively small particles of the liquid or pasty substance/mixture of substances are formed. This leads to a finely particulate, relatively easily flowing and thus relatively easily meterable product from the liquid or pasty substance/mixture of substances. A further advantage of the process according to the invention is that by varying the flow ratios of substances/mixtures of substances and liquid or supercritical carbon dioxide, the final temperature which is established may be influenced in broad ranges.

It is envisaged that the liquid or supercritical carbon dioxide has a pressure of from 5 to 500 bar and a temperature of from 216 to 373 K, preferably a pressure of from 10 to 200 bar and a temperature of from 230 to 323 K, and particularly preferably a pressure of from 15 to 80 bar and a temperature of from 248 to 313 K. This produces the advantage that at a preferred pressure range and temperature range the carbon dioxide can be taken off directly from the supply systems, for example low-pressure and medium-pressure tanks or carbon dioxide cylinders, without further gas treatment.

According to the invention the mixture of liquid or pasty substance/mixture of substances and liquid or supercritical carbon dioxide is expanded to a pressure from 0 to 60 bar, preferably to a pressure from 0 to 20 bar, and particularly preferably to approximately 1 bar. The expansion to atmospheric pressure (approximately 1 bar) has the advantage that filling can be performed directly into unpressurized systems and the potential cold content of the carbon dioxide can be exploited to the maximum in each case.

According to the invention the liquid or pasty substance/mixture of substances and/or or liquid or supercritical carbon dioxide and/or the mixture of liquid or pasty substance/mixture of substances and liquid or supercritical carbon dioxide can be fed to at least one heatable or coolable line. Using a heatable or coolable line, the temperature for the liquid or pasty substance/mixture of substances and/or the liquid or supercritical carbon dioxide and/or the mixture of liquid or pasty substance/mixture of substances and liquid or supercritical carbon dioxide can be controlled, in order to set the desired or required process temperature.

The mixture of liquid or pasty substance/mixture of substances and liquid or supercritical carbon dioxide is fed, according to the invention, to a mixer, preferably a static mixer, before it is expanded. As a result, advantageously, an intensive mixing of liquid or pasty substance/mixture of substances and liquid or supercritical carbon dioxide is achieved.

According to the invention the liquid or pasty substance/mixture of substances is mixed with the liquid or supercritical carbon dioxide upstream of the feed into a heat exchanger and/or upstream of the feed into a mixer and/or upstream of the expansion of the mixture of liquid or pasty substance/mixture of substances and liquid or supercritical carbon dioxide, or directly in a two-component nozzle for expansion of the mixture of liquid or pasty substance/ mixture of substances and liquid or supercritical carbon dioxide. Mixing the liquid or pasty substance/mixture of substances with the liquid or supercritical carbon dioxide upstream of the feed into a heat exchanger produces the advantage that undesirable mixing temperatures which adversely affect a component are excluded. If the mixing is performed upstream of the feed into a mixer or directly upstream of the expansion of the mixture of liquid or pasty substance/mixture of substances and liquid or supercritical carbon dioxide, advantageously an intensive mixing of the liquid or pasty substance/mixture of substances with the liquid or supercritical carbon dioxide is achieved. The mixing directly in a two-component nozzle for expansion of the mixture of liquid or pasty substance/mixture of substances and liquid or supercritical carbon dioxide is advantageous, since here there is no direct contact between the liquid or pasty substance/mixture of substances and carbon dioxide upstream of the expansion and therefore the two temperatures can be set independently of one another.

The object is further achieved by an apparatus for cooling liquid or pasty substances or mixtures of substances which has a storage vessel for the liquid or pasty substance/mixture of substances to which is allocated a line in which a device for transporting the liquid or pasty substance/mixture of substances is disposed, which apparatus has a source of liquid or supercritical carbon dioxide, to which source is allocated a line, and it has a connection point, via which the line allocated to the storage vessel for the liquid or pasty substance/mixture of substances is connected to the line allocated to the source of liquid or supercritical carbon dioxide and which has an expansion apparatus. The apparatus is constructed in such a manner that the mixture of liquid or pasty substance/mixture of substances and liquid or supercritical carbon dioxide, is not expanded until on exit from the expansion apparatus. The apparatus ensures rapid cooling and atomization of the liquid or pasty substance/ mixture of substances. A very direct contact takes place out between the liquid or pasty substance/mixture of substances and the liquid or supercritical carbon dioxide. By use of the inventive expansion apparatus, small, easily flowable particles of the liquid or pasty substance/mixture of substances are produced.

The apparatus has, according to the invention, a mixer, preferably a static mixer, in order to mix the liquid or pasty substance/mixture of substances and the liquid or supercritical carbon dioxide.

Advantageously, the lines or apparatuses or devices bearing the liquid or pasty substance/mixture of substances and/or the liquid or supercritical carbon dioxide and/or the lines or apparatuses or devices bearing the mixture of liquid or pasty substance/mixture of substances and liquid or supercritical carbon dioxide have apparatuses for their heating or cooling, in order to set the desired or required temperature in the individual trains bearing carbon dioxide and/or substance/mixture of substances. The line(s) should preferably be heated or cooled separately. Piping having internals for heating is preferred.

According to the invention it is provided to dispose a device for transporting the liquid or pasty substance/mixture of substances and/or an apparatus for heating or cooling in the line allocated to the source of liquid or supercritical carbon dioxide. The device for transporting the liquid or pasty substance/mixture of substances is, for example, a compressor or a pump.

It is envisaged that an apparatus for heating or cooling is allocated to the line allocated to the storage vessel for the liquid or pasty substance/mixture of substances.

According to the invention an apparatus for heating or cooling is allocated to the line which is disposed upstream or downstream of the mixer.

According to the invention the expansion apparatus has a valve or a nozzle. According to the invention, the valve used can be an open/closed valve or a control valve.

The nozzle or the valve advantageously has a shielding device, preferably a jacket tube. The use of a nozzle having a jacket tube has the advantage that only a relatively small amount of air is taken in or sucked into the gas-substance stream. The carbon dioxide in this case is at least partially converted into carbon dioxide snow. Typically, approximately 30% by weight of carbon dioxide snow and approximately 70% by weight of gaseous carbon dioxide are formed during the expansion of the liquid carbon dioxide at the nozzle.

Preferably, the tube of the expansion device through which the mixture is passed is prepared. This can be performed by polishing or coating or separate heating. According to the invention a coating with Teflon of the inside of the tube of the expansion device through which the mixture is passed is particularly preferred.

The process according to the invention or the apparatus according to the invention can advantageously be used for homogenizing, pulverizing, pelleting, granulating, crystallizing, precipitating, freeze-drying or digesting cells. The use for pulverizing, pelleting, granulating and crystallizing is preferred.

For example, using the process of the invention or the apparatus of the invention, a fat powder or a crystal-line aqueous product can advantageously be prepared.

The process of the invention and the apparatus of the invention are particularly suitable for producing products which consist of a mixture of different substances. Thus, for example, fat powder containing additives, for example flour, can be produced.

THE DRAWINGS

FIGS. 1–4 are schematic showings of various practices of the invention.

DETAILED DESCRIPTION

Figure 2:
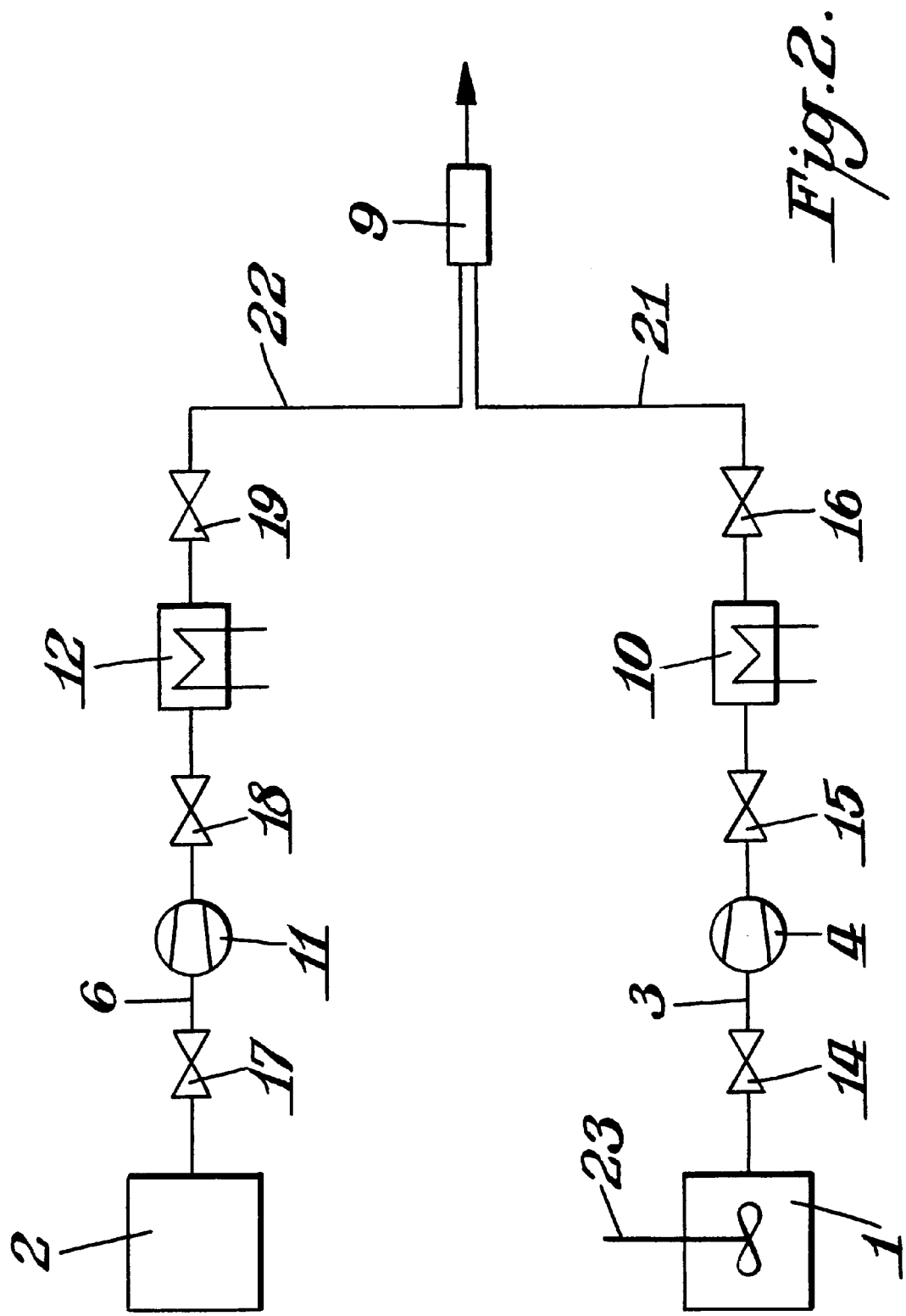
Figure 3:
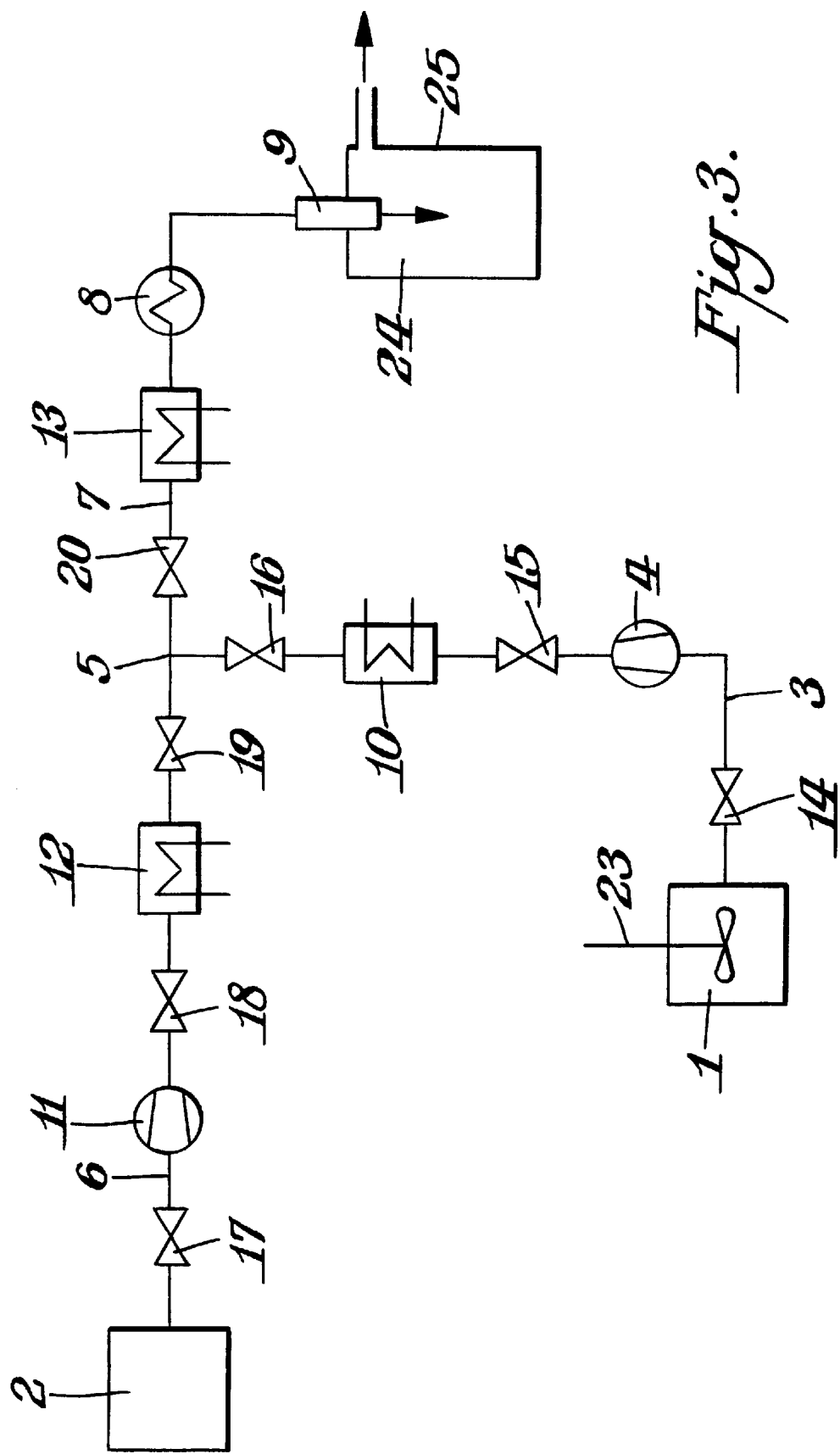
Figure 4:
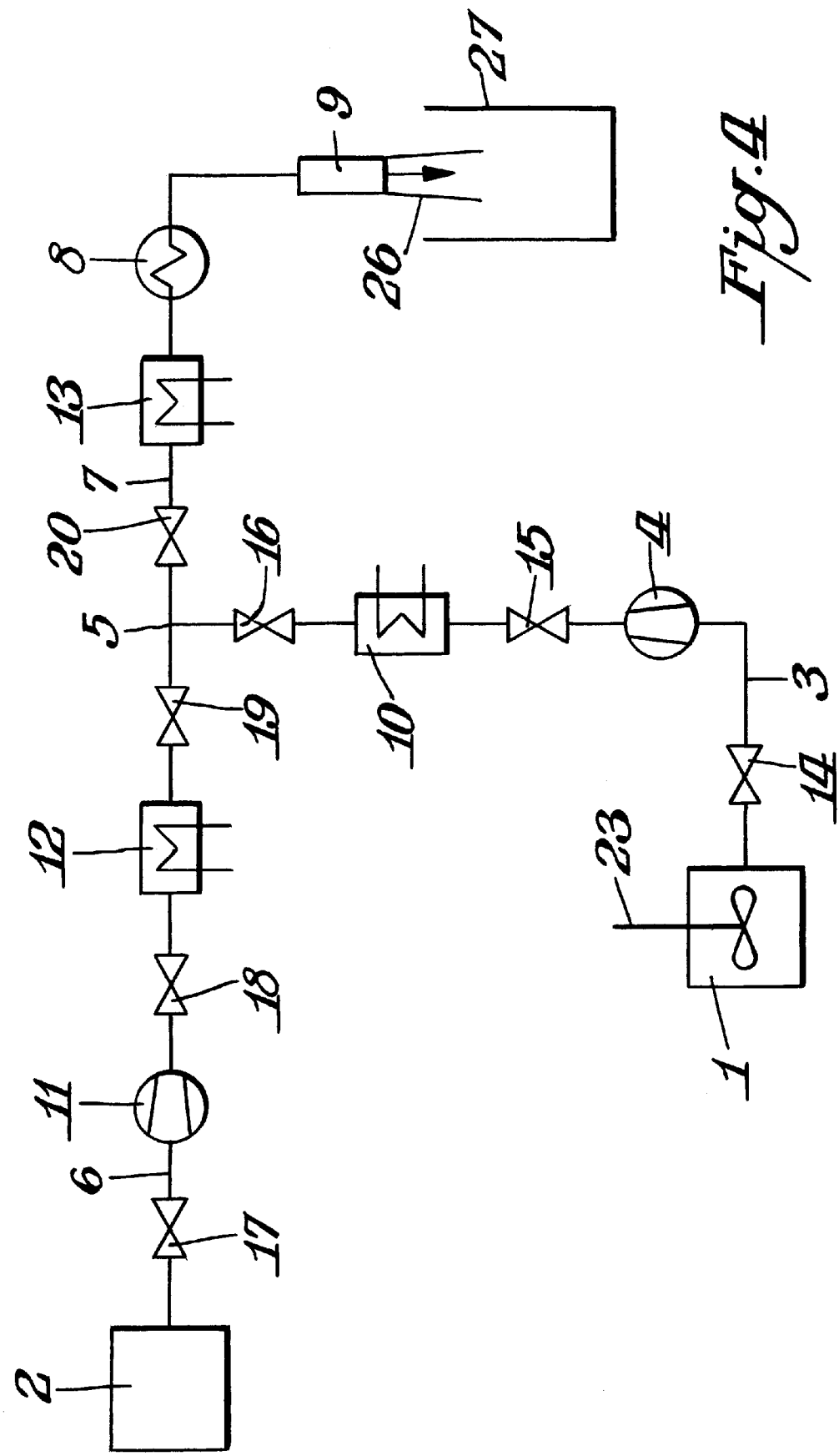

FIG. 1 shows an apparatus for cooling liquid or pasty substances or mixtures of substances, different variants of the apparatus are shown in FIG. 2 to FIG. 4.

The apparatus shown in FIG. 1 for cooling liquid or pasty substances or mixtures of substances has a storage vessel 1 for the liquid or pasty substance/mixture of substances and a source 2 of liquid carbon dioxide. An agitator (not shown in FIG. 1) can be disposed in storage vessel 1. The source 2 can be, for example, a siphon-tube cylinder or a tank for liquid carbon dioxide. Via a line 3 and a pump 4, the liquid or pasty substance/mixture of substances is fed to a connection point 5 into which a line 6 opens through which the liquid carbon dioxide is fed from the source 2. Via the connection point 5 the stream of the liquid or pasty substance/mixture of substances is combined with the stream of the liquid carbon dioxide. The resultant stream of the mixture of the liquid or pasty substance/mixture of substances and the liquid carbon dioxide is fed if appropriate to a static mixer 8 via a line 7. The mixture exiting from the mixer 8 is passed into an apparatus 9 for expanding the mixture. If appropriate, in addition, the line 3 can be heatable or coolable, for example using a pipe heater 10, in order to set the temperature of the liquid or pasty substance/mixture of substances to a defined value. In addition, a pump 11 for transporting the liquid carbon dioxide and/or an apparatus for heating for cooling, for example a pipe heater or cooler 12, for controlling the temperature of the liquid carbon dioxide can be disposed in the line 6. The temperature of the mixture of the liquid or pasty substance/mixture of substances and the liquid carbon dioxide can if necessary additionally be controlled via a heatable or coolable line 7, for example using a pipe heater or cooler 13. In addition, valves 14, 15, 16, 17, 18, 19 and 20 are further disposed in the lines 3, 6 and 7 in order to control the flow rates.

The apparatus of FIG. 2 essentially corresponds to the apparatus shown in FIG. 1, here, in contrast to the apparatus according to FIG. 1, the streams of the liquid or pasty substance/mixture of substances and the liquid carbon dioxide being combined via a line 21 and 22 of the apparatus 9 for expansion of the mixture, via which these are not combined until the apparatus 9 for expansion of the mixture. In addition, here, an agitator 23 is disposed in the storage vessel 1.

FIG. 3 and FIG. 4 show further embodiment variants of the apparatus shown in FIG. 1 having different designs of the apparatus 9 for expanding the mixture.

In FIG. 3, the outlet of the apparatus 9 for expanding the mixture opens into a sealed vessel 24 having an exhaust gas tube 25.

In FIG. 4, a snow tube 26 is allocated to the apparatus 9 for expanding the mixture. The snow tube 26 here opens into an open vessel 27.

Exemplary Embodiment

In a heated storage vessel, 1 kg of fat (emulsifier ST45) was heated to a temperature of approximately 80° C. and liquefied. The liquid fat was pumped by a pump through heated pipes to a collection tube having a subsequent expansion nozzle. From a carbon dioxide tank, liquid carbon dioxide was introduced at the same time at a pressure of 58 bar likewise into the collection tube having a subsequent expansion nozzle. The nozzle cross sectional area of the expansion nozzle The nozzle cross sectional area of the expansion nozzle was 0.5 mm. The mixture of liquid fat and liquid carbon dioxide exited downstream of the nozzle as pulverulent fat in a flowable state. The particle size of the fat powder was 100% less than 630 $\mu$m.

The invention is not restricted to the use of carbon dioxide as refrigerant. Rather, all liquid gases suitable for the process and the apparatus can be used. In particular, gases are suitable which are liquid under pressure at usual ambient temperature, that is to say at from approximately 273 to 308 K, for example propane.

What is claimed is:

1. A process for cooling and atomizing a component (a) which consists of liquid of pasty substances or mixtures of substances, comprising combining the component (a) with a component (b) which consists of liquid or supercritical carbon dioxide, and then expanding the resulting combination, as a result of which the component (a) is cooled and atomized.

2. The process as claimed in claim 1, in which the liquid or supercritical carbon dioxide has a pressure of from 10 to 200 bar and a temperature of from 230 to 323 K.

3. The process as claimed in claim 2, in which the liquid or supercritical carbon dioxide has a pressure of from 15 to 80 bar and a temperature of from 248 to 313 K.

4. The process as claimed in claims 1, which the resulting combination is expanded to a pressure from 0 to 20 bar.

5. The process as claimed in claim 4, in which the resulting combination is expanded to a pressure of approximately 1 bar.

6. The process as claimed in claim 1, in which at least one of the component (a) and component (b) is fed to at least one heatable or coolable line.

7. The process as claimed in claim 1, in which the resulting combination is, before it is expanded, fed to a mixer.

8. The process as claimed in claim 1, in which the component (a) is mixed with the component (b) at a location selected from the group consisting of the location being upstream of a feed of at least one of component (a) and component (b) into a heat exchanger, the location being upstream of the feed into a mixer, the location being upstream of the expansion of the mixture of components (a) and (b), and the location being directly in a two-component nozzle.

9. An apparatus for cooling a component (a) consisting of liquid or pasty substances or a mixture of the substances comprising a storage vessel for the component (a) to which is allocated a line in which a device for transporting the component (a) is disposed, which apparatus has a source of component (b) consisting of liquid or supercritical carbon dioxide, to which source is allocated a line and it has a connection point via which the line allocated to the storage vessel for component (a) is connected to the line allocated to the source of the component (b), which apparatus has a mixer to mix the component (a) and component (b), and which apparatus has an expansion apparatus for expanding the resulting combination of component (a) and component (b) to thereby cool and atomize component (a).

10. The apparatus as claimed in claim 9, in which the mixer is a static mixer.

11. The apparatus as claimed in claim 9, in which at least one of a device for transporting component (b) and an apparatus for heating or cooling the line allocated to the source of component (b) is disposed in the line allocated to the source of component (b).

12. The apparatus as claimed in claim 9, in which an apparatus for heating or cooling the line is allocated to the line allocated to the storage vessel for the component (a).

13. The apparatus as claimed in one of claim 9, in which an apparatus for heating or cooling the line is allocated to the line disposed upstream or downstream of the mixer.

14. The apparatus as claimed in claim 9, in which the expansion apparatus has a nozzle or a valve.

15. The apparatus as claimed in claim 14, in which the nozzle or the valve has a jacket tube.

16. The apparatus as claimed in claim 14, in which the valve is an open/closed valve or a control valve.

17. The apparatus as claimed in claim 9, in which the expansion apparatus has a snow tube.

18. The process as claimed in claim 1 including forming the component (a) after being cooled and atomized into finely particulate form, and pulverizing, pelleting, granulating, crystallizing the component (a).

19. The process as claimed in claim 1 including forming the component (a) after being cooled and atomized into finely particulate form, and adding an additive to the component (a) for the production of fat powders.

* * * * *